United States Patent
Tan

(10) Patent No.: US 8,411,846 B2
(45) Date of Patent: Apr. 2, 2013

(54) ECHO PATH CHANGE DETECTION IN TELECOMMUNICATIONS NETWORKS

(75) Inventor: Mizhou Tan, Easton, PA (US)

(73) Assignee: Agere Systems LLC, Allentown, PA (US)

( * ) Notice: Subject to any disclaimer, the term of this patent is extended or adjusted under 35 U.S.C. 154(b) by 1363 days.

(21) Appl. No.: 12/117,943

(22) Filed: May 9, 2008

(65) Prior Publication Data

US 2009/0279686 A1    Nov. 12, 2009

(51) Int. Cl.
*H04M 9/08*    (2006.01)
(52) U.S. Cl. .............................. 379/406.08; 379/406.07
(58) Field of Classification Search ............ 379/406.01–406.16; 370/282–286; 381/66.93, 94.1, 94.3; 455/570
See application file for complete search history.

(56) References Cited

U.S. PATENT DOCUMENTS

| 6,035,034 | A | 3/2000 | Trump | 379/410 |
|---|---|---|---|---|
| 6,226,380 | B1 * | 5/2001 | Ding | 379/413.01 |
| 6,282,176 | B1 * | 8/2001 | Hemkumar | 370/276 |
| 7,613,291 | B1 * | 11/2009 | Benyassine et al. | 379/406.08 |
| 2005/0169457 | A1 * | 8/2005 | Johnston et al. | 379/406.08 |
| 2007/0286404 | A1 * | 12/2007 | Popovic et al. | 379/406.01 |

OTHER PUBLICATIONS

"A Novel Adaption Scheme in the NLMS Algorithm for Echo Cancellation" by Jianfeng Liu, IEEE Signal Processing Letters, vol. 8, No. 1, Jan. 2001, pp. 20-22.

* cited by examiner

*Primary Examiner* — MD S Elahee
*Assistant Examiner* — Akelaw Teshale
(74) *Attorney, Agent, or Firm* — Mendelsohn, Drucker & Associates, P.C.; Craig M. Brown; Steve Mendelsohn

(57) ABSTRACT

In one embodiment, the present invention is a method for detecting an echo path change (EPC) in a telecommunications network. The method detects whether the effectiveness of echo cancellation of an echo canceller has decreased relatively significantly. Once a relatively significant decrease is detected, the method determines whether the decrease was an EPC or an inadvertent detection of double talk (DT). In particular, the method considers whether echo is effectively cancelled over a hangover period. Further, echo return loss (ERL) estimates are generated over the hangover period and compared to a lowest-possible ERL for the network. If both (1) echo cancellation is ineffective and (2) a sufficient number of ERL estimates are not below the worst-case ERL, then an EPC decision is made. If either (1) echo cancellation is effective or (2) a sufficient number of ERL estimates are below the worst-case ERL, then a DT decision is made.

27 Claims, 3 Drawing Sheets

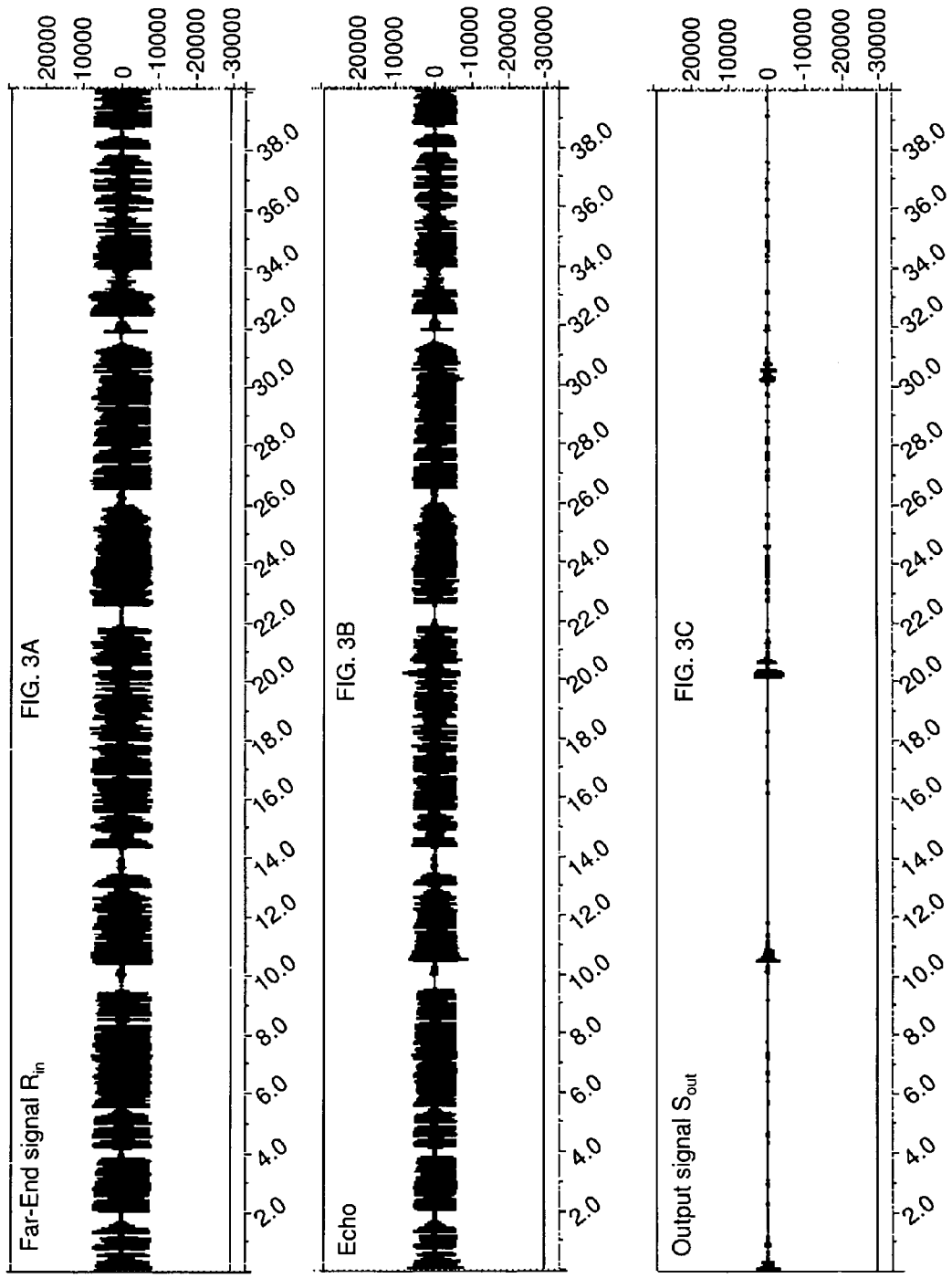

ECHO PATH CHANGE DETECTION IN TELECOMMUNICATIONS NETWORKS

BACKGROUND OF THE INVENTION

1. Field of the Invention

The present invention relates to telecommunications networks, and, in particular, to the detection of echo path changes in such networks.

2. Description of the Related Art

FIG. 1 shows a simplified block diagram of a near end 100 of a prior-art telecommunications network. In particular, FIG. 1 shows near end 100 for a first user who communicates with a second user located at a far end (not shown) of the network. As depicted in FIG. 1, near end 100 has two communication paths: (1) a lower path for receiving signals $R_{in}$ generated at the far end of the network and (2) an upper path for communicating signals $S_{out}$ to the far end. The far end may be implemented in a manner similar to that of near end 100, rotated by 180 degrees such that the far end receives signals via its upper path and communicates signals via its lower path.

Received signals $R_{in}$ are routed to communications device 102 via hybrid 104, which may be implemented as a two-wire-to-four-wire converter that separates the upper and lower communication paths. Communications device 102 may be implemented as a land-line telephone, cell phone, or any other suitable communications device. Signals $S_{gen}$ generated at communications device 102 are routed through hybrid 104 to echo canceller 106 (discussed below), which processes the signals and provides output signals $S_{out}$ to the far end.

In generating signals at near end 100, unwanted echo may be introduced that diminishes the quality of the signals communicated to the far end. Generally, there are two types of echo that may be introduced: acoustic echo and hybrid echo (a.k.a., circuit echo or electric echo). Acoustic echo may be introduced when the loudspeaker of communications device 102 generates audio corresponding to signals $R_{in}$ received from the far end and the audio is picked up by the microphone of the device. Hybrid echo may be introduced when there is an impedance mismatch in the hybrid that allows a portion of received signals $R_{in}$ to be reflected back to the far end via the upper path.

The amount of echo in relation to received signal $R_{in}$ may be described in terms of an echo return loss (ERL). For example, between hybrid 104 and echo canceller 106, the ERL may be quantified as the ratio of (i) the energy $|R_{in}|^2$ of the far-end signal $R_{in}$ to (ii) the energy of the far-end signal $R_{in}$ that is present in the near-end signal (i.e., the energy of the corresponding echo) as shown in Equation (1):

$$ERL_i = \frac{|R_{in,i}|^2}{|echo_i|^2} \quad (1)$$

where subscript i denotes the $i^{th}$ iteration. In practice, the ERL may change during communications due to echo path changes (EPCs) that may result from, for example, changes in line impedance or signal routing. When an EPC occurs, the ratio of the energy $|R_{in}|^2$ of the far-end signal $R_{in}$ to the energy of the echo (i.e., the ERL) may change. On the other hand, when an EPC is not occurring, the ERL typically remains relatively constant. In this situation, as the energy $|R_{in}|^2$ of the far-end signal $R_{in}$ increases, the energy of the echo increases proportionately, and when the energy $|R_{in}|^2$ of the far-end signal $R_{in}$ decreases, the energy of the echo decreases proportionately.

When a call is initiated or when an EPC occurs, echo canceller 106 adapts to the new echo path so that it may effectively remove the new echo from input signal $S_{in}$. Adaptation is performed using an update loop comprising combiner 108, adaptive filter 110, and controller 112. Combiner 108 receives (1) an estimate of the echo from adaptive filter 110 and (2) input signal $S_{in}$ from hybrid 104, and removes the estimated echo from input signal $S_{in}$ to obtain output signal $S_{out}$. Controller 112 receives signals $R_{in}$, $S_{in}$, and $S_{out}$, and generates an estimate of the residual echo contained within $S_{out}$. Based on this residual echo estimate, controller 112 updates filter coefficients using an adaptive algorithm, such as a normalized-least-mean-squares (NLMS) algorithm. Adaptive filter 110 applies the updated filter coefficients to received signal $R_{in}$ and outputs an updated estimate of the echo to combiner 108. This process is repeated, and, for each iteration, controller 112 attempts to step towards filter coefficients that, when applied to received signal $R_{in}$ by adaptive filter 110, produce an echo estimate that results in output signal $S_{out}$ having a residual echo of approximately zero. When the residual echo becomes approximately zero, echo canceller 106 has converged on an estimated echo that reflects the actual echo contained within input signal $S_{in}$.

The effectiveness of echo canceller 106 in canceling echo (i.e., in reducing echo whether or not the reduction is complete) may be described in terms of an echo return loss enhancement (ERLE). ERLE may be quantified as the ratio of (i) the energy of the echo input into echo canceller 106 to (ii) the energy of the residual echo output from echo canceller 106 as shown in Equation (2) below:

$$ERLE_i = \frac{|echo_i|^2}{|resid\_echo_i|^2} \quad (2)$$

Generally, echo cancellation becomes more effective as the proportion of echo energy to residual echo energy increases (i.e., the ERLE increases). When echo canceller 106 has converged on the echo, the ERLE will typically be very large because the residual echo energy, if any, will be small in proportion to the echo energy. If an EPC occurs after echo canceller 106 has converged on the echo, then the echo energy will generally change, and the residual echo may become comparable to or even larger than the new echo energy, resulting in a small ERLE value, which might be less than 1.

The ability of echo canceller 106 to converge on the actual echo may be affected by the presence of signals $S_{gen}$ generated at communication device 102. A condition known as "double talk" occurs when both the near-end user and the far-end user are talking simultaneously so that input signal $S_{in}$ includes signals corresponding to both the near-end user of device 102 (e.g., $S_{gen}$) and the far-end user (e.g., echo). In such a situation, combiner 108 outputs signal $S_{out}$, which comprises generated signal $S_{gen}$ and residual echo. Controller 112 might have difficulty in differentiating between generated signal $S_{gen}$ and the residual echo, thereby making it relatively difficult for echo canceller 106 to converge on the actual echo. In some instances, the presence of double talk might be counterproductive and might actually cause echo canceller 106 to diverge from the actual echo. Thus, when double talk is present, it may be desirable to inhibit adaptation of echo canceller 106 to prevent divergence.

Various control algorithms 112 may be implemented that (1) improve the ability of adaptive filter 110 to converge on the actual echo or (2) prevent adaptive filter 110 from diverging. One such control algorithm may adjust the size of the steps taken toward the estimated echo during adaptation. For example, during initial convergence, the algorithm may direct adaptive filter 110 to use a larger step size for more aggressive initial convergence. As convergence nears, the algorithm may direct adaptive filter 110 to use a smaller step size to reduce any possible steady-state error.

Another such control algorithm may be employed to detect the presence of double talk. When double talk is detected, adaptation of the echo canceller 106 may be inhibited to prevent divergence and the coefficients used just prior to inhibition may be used for echo cancellation.

Yet another such control algorithm may be employed to detect EPCs that occur after echo canceller 106 converges on the actual echo. When an EPC has been detected, the control algorithm may direct controller 112 to restart adaptation from a more aggressive mode to achieve relatively quick re-convergence. One implementation of an EPC detection algorithm, which uses parallel adaptive filtering, is discussed in Liu, "A Novel Adaptation Scheme in the NLMS Algorithm for Echo Cancellation," IEEE Signal Processing Letters, Vol. 8, No. 1, January 2001, pp. 20-22, the teachings of which are incorporated herein by reference. Another implementation of an EPC detection algorithm, which uses correlation methods, is discussed in U.S. Pat. No. 6,305,034, the teachings of which are incorporated herein by reference.

SUMMARY OF THE INVENTION

In one embodiment, the present invention is a method and apparatus for detecting a possible occurrence of an echo path change in a telecommunications network. The apparatus implements the method, which comprises generating (i) a pre-cancellation measure of average energy of a near-end signal in the telecommunications network prior to echo cancellation, (ii) a post-cancellation measure of average energy of the near-end signal after the echo cancellation, and (iii) an echo return loss enhancement (ERLE) estimate based on the pre-cancellation near-end average energy measure and the post-cancellation near-end average energy measure. This process is repeated to generate a plurality of ERLE estimates, and different ERLE estimates are compared to one another to detect the possible occurrence of the echo path change.

In another embodiment, the present invention is a method and apparatus for determining whether a possible occurrence of an echo path change is an actual occurrence of the echo path change or an occurrence of double talk in a telecommunications network. The apparatus implements the method, which comprises detecting the possible occurrence of the echo path change. Then, magnitudes of a post-cancellation near-end signal in the telecommunications network are compared to magnitudes of a pre-cancellation near-end signal in the telecommunications network. A counter value is generated based on the comparisons of the post-cancellation near-end signal magnitudes to the pre-cancellation near-end signal magnitudes. The counter value is compared to a specified threshold level to determine whether the possible occurrence of the echo path change is the occurrence of the double talk.

In another embodiment, the present invention is a method and apparatus for determining whether a possible occurrence of an echo path change is an actual occurrence of the echo path change or an occurrence of double talk in a telecommunications network. The apparatus implements the method, which comprises detecting the possible occurrence of the echo path change. The method generates (i) pre-cancellation measures of average energy of a near-end signal in the telecommunications network, (ii) far-end average energy measures of a far-end signal in the telecommunications network, and (iv) echo return loss (ERL) estimates based on the far-end average energy measures and the pre-cancellation near-end average energy measures. The ERL estimates are compared to a boundary value, and a counter value is generated based on these comparisons. The counter value is compared to a specified threshold level to determine whether the possible occurrence of the echo path change is the occurrence of the double talk.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3A-C graphically illustrate exemplary results of a simulation performed for an echo canceller that implements an EPC detector of the present invention.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
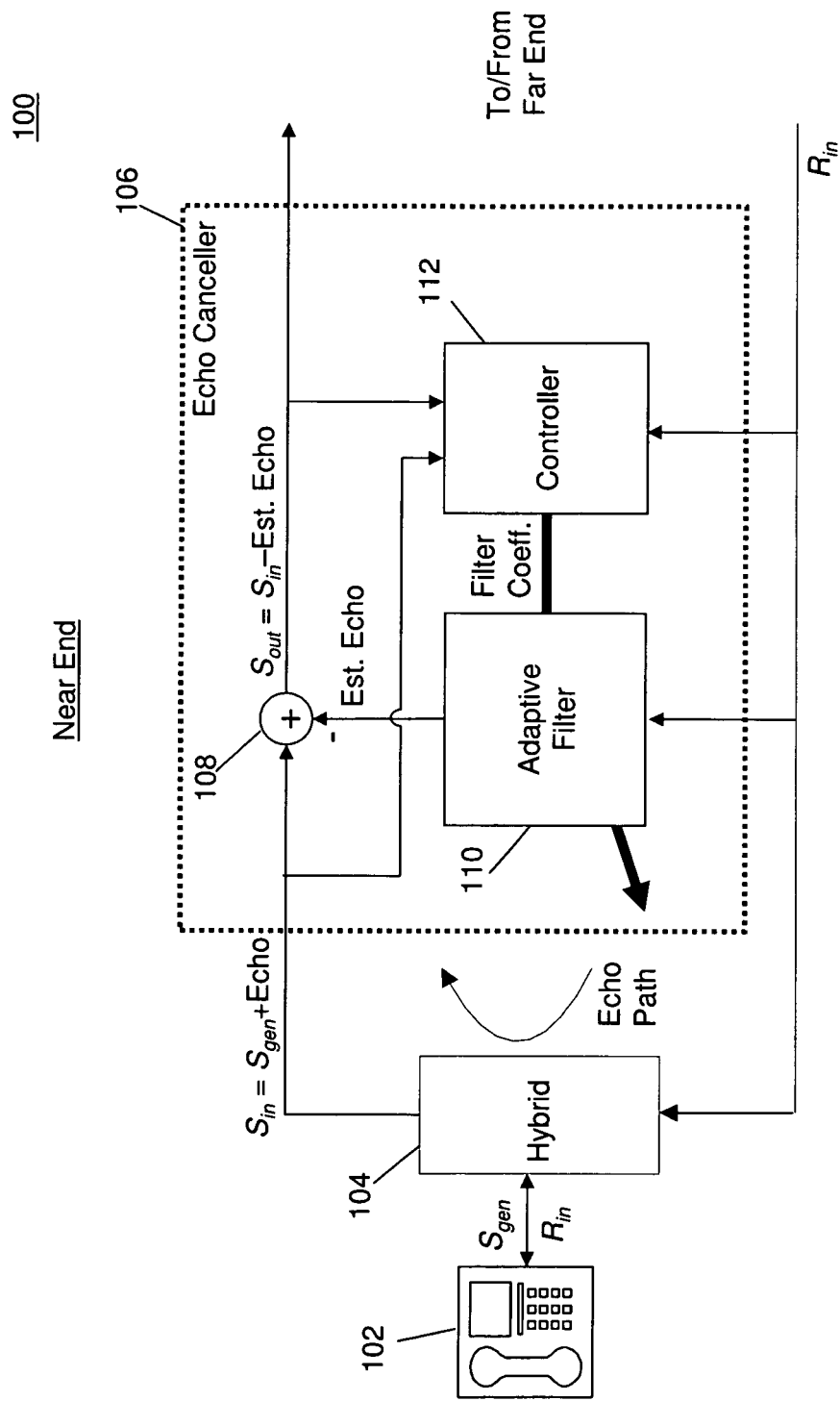
FIG. 1 shows a simplified block diagram of a near end of a prior-art telecommunications network.
Figure 2:
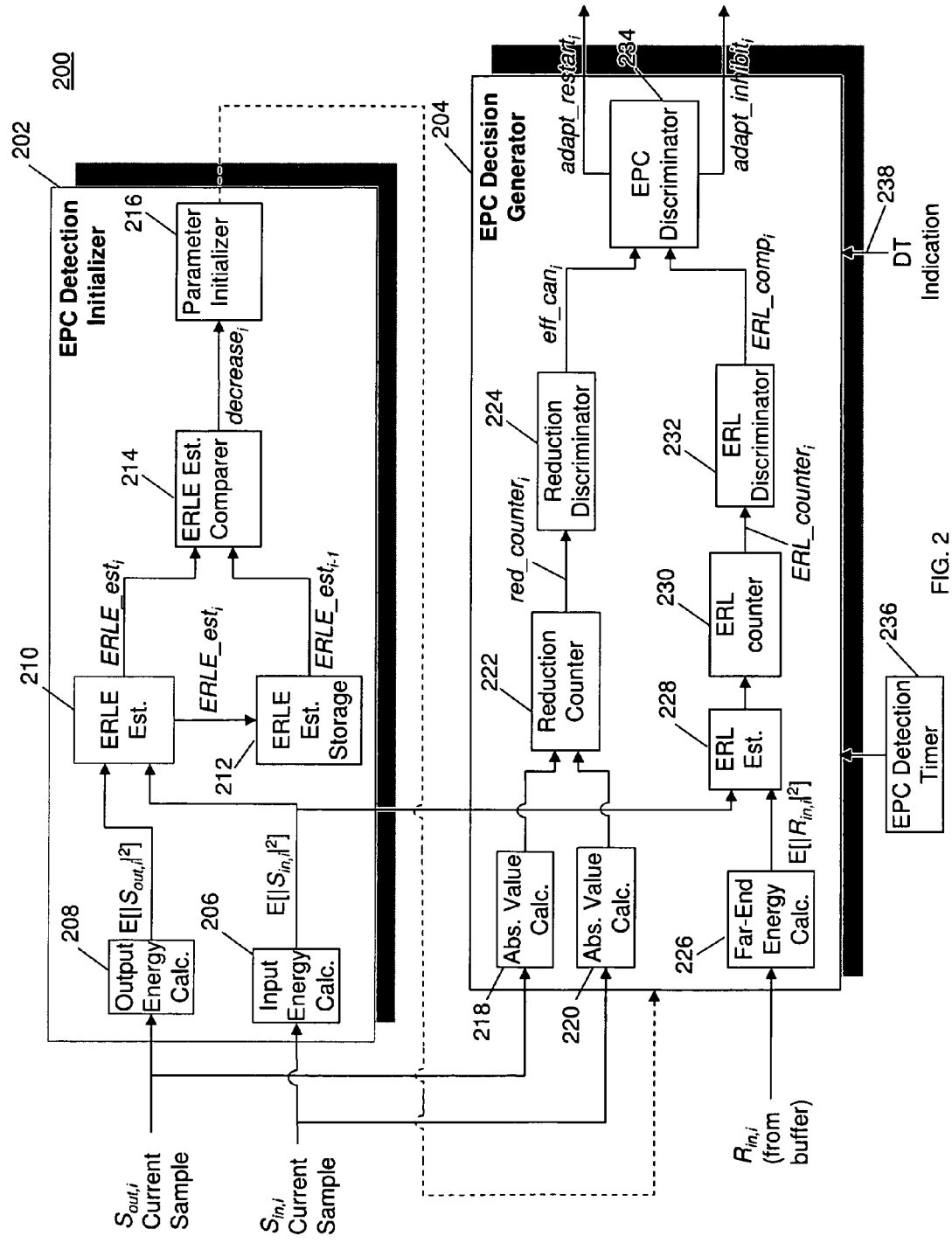
FIG. 2 shows a simplified block diagram of an echo path change (EPC) detector according to one embodiment of the present invention.

Overview of One Embodiment of an Echo Path Change Detector of the Present Invention FIG. 2 shows a simplified block diagram of an echo path change (EPC) detector 200 according to one embodiment of the present invention. EPC detector 200 can be implemented in a controller analogous to controller 112 of echo canceller 106 of FIG. 1 to detect EPCs in a telecommunications network. EPC detector 200 receives (1) input signal $S_{in}$ generated at the near end of the telecommunications network, (2) signal $S_{out}$ output from the echo canceller, and (3) signal $R_{in}$ received from the far end of the network. Based on these signals, decisions are generated as to whether EPCs have occurred using EPC detection initializer 202 and EPC decision generator 204. These decisions are then used to modify an adaptation restart control signal (adapt_restart$_i$) and an adaptation inhibit control signal (adapt_inhibit$_i$).

EPC detection initializer 202 detects whether a possible EPC has occurred based on input signal $S_{in}$ and output signal $S_{out}$. In particular, EPC detection initializer 202 attempts to detect relatively significant decreases in the effectiveness of echo cancellation that may indicate that a possible EPC has occurred. Note that, the terms "echo cancellation" or "cancellation of echo," as used in this specification, refer to reductions of echo whether or not the reductions are complete. If a possible EPC is not detected, then EPC detection initializer 202 continues to detect possible EPCs. If a possible EPC is detected, then EPC detection initializer 202 initializes a set of parameters used by EPC decision generator 204, and EPC decision generator 204 is triggered to begin processing.

In attempting to detect relatively significant decreases in the effectiveness of echo cancellation (i.e., possible EPCs), EPC detection initializer 202 might also inadvertently detect occurrences of double talk (DT). Thus, EPC decision generator 204 is employed to distinguish EPCs from occurrences of DT. If EPC decision generator 204 determines that a possible EPC is in fact an EPC, then adaptation restart control signal adapt_restart$_i$ is asserted to restart adaptation of the echo canceller. However, if EPC decision generator 204 determines that the possible EPC was actually an occurrence of DT, then adaptation inhibit control signal adapt_inhibit$_i$ is asserted to inhibit adaptation of the echo canceller. Adaptation may be resumed when EPC detector 200 receives an indication 238 that DT is no longer present.

EPC Detection Initializer

EPC detection initializer 202 attempts to detect relatively significant decreases in echo cancellation effectiveness (i.e., possible EPCs) by generating estimates of the echo return loss enhancement (ERLE) of the echo canceller and by comparing the ERLE estimates to one another. A relatively significant decrease from one ERLE estimate to the next may indicate a relatively significant decrease in echo cancellation effectiveness (i.e., a possible EPC), while a relatively insignificant decrease from one ERLE estimate to the next typically indicates that echo cancellation effectiveness has not changed significantly (i.e., a possible EPC has not occurred).

In generating ERLE comparisons, EPC detection initializer 202 first generates (1) average energy values $E[|S_{in,i}|^2]$ for samples of input signal $S_{in}$ using input energy calculator 206 and (2) average energy values $E[|S_{out,i}|^2]$ for samples of output signal $S_{out}$ using output energy calculator 208. Each new averaged input energy value $E[|S_{in,i}|^2]$ and each new averaged output energy value $E[|S_{out,i}|^2]$ may be calculated using expected value (e.g., weighted moving average) methods as shown in Equations (3) and (4), respectively:

$$E[|S_{in,i}|^2] = \alpha E[|S_{in,i-1}|^2] + (1-\alpha)|S_{in,i}|^2 \quad (3)$$

$$E[|S_{out,i}|^2] = \alpha E[|S_{out,i-1}|^2] + (1-\alpha)|S_{out,i}|^2 \quad (4)$$

where $\alpha$ is a weighting constant between 0 and 1, $E[|S_{in,i-1}|^2]$ is the averaged input energy value for the previous iteration, $E[|S_{out,i-1}|^2]$ is the averaged output energy value for the previous iteration, $|S_{in,i}|^2$ is the energy value for the current sample of input signal $S_{in}$, and $|S_{out,i}|^2$ is the energy value for the current sample of output signal $S_{out}$.

The ERLE estimates are generated by ERLE estimator 210 based on the averaged energy calculations. In particular, each new ERLE estimate (ERLE_est$_i$) is generated by replacing (i) the echo energy of Equation (2) with an averaged input energy value $E[|S_{in,i}|^2]$ and (ii) the residual echo energy of Equation (2) with an averaged output energy value $E[|S_{out,i}|^2]$ as shown in Equation (5) below:

$$\text{ERLE\_est}_i = \frac{E[|S_{in,i}|^2]}{E[|S_{out,i}|^2]}. \quad (5)$$

The new ERLE estimate ERLE_est$_i$ is output to ERLE estimate comparer 214, which compares the new estimate ERLE_est$_i$ to the prior ERLE estimate ERLE_est$_{i-1}$ received from ERLE estimate storage 212 to determine whether a relatively significant decrease in ERLE estimates has occurred.

As described above, a relatively significant decrease from one ERLE estimate to the next (i.e., from a prior ERLE estimate ERLE_est$_{i-1}$ to a new ERLE estimate ERLE_est$_i$) may be indicative of a relatively significant decrease in echo cancellation effectiveness (i.e., a possible EPC). When DT is not present, input signal $S_{in}$ comprises substantially only echo and output signal $S_{out}$ comprises substantially only residual echo. As the echo canceller approaches convergence on the actual echo, the ERLE estimates will typically increase because the proportion of echo energy (i.e., $E[|S_{in,i}|^2]$) to residual echo energy (i.e., $E[|S_{out,i}|^2]$) will increase. However, when an EPC occurs, a new echo path is introduced, and initially, the amount of new echo cancelled by the echo canceller will typically be smaller than the amount of echo cancelled prior to the EPC. As a result, immediately after an EPC, the current residual echo energy (i.e., $E[|S_{out,i}|^2]$) may be substantially greater than the previous residual echo energy (i.e., $E[|S_{out,i-1}|^2]$) causing the ERLE estimates to decrease significantly.

A relatively significant decrease from one ERLE estimate to the next may also be indicative of an occurrence of double talk (DT) rather than an EPC. For example, suppose that the echo canceller had converged on the echo or was approaching convergence on the echo prior to the occurrence of DT, and thus, the ERLE estimates were relatively large. When DT occurs, signal $S_{gen}$, generated at a communications device, such as communications device 102 of FIG. 1, is added to both the input signal $S_{in}$ and the output signal $S_{out}$. As a result of the addition of signal $S_{gen}$, the energy of $S_{in}$ and $S_{out}$ might become substantially equal. Further, in certain situations, the occurrence of DT may cause the echo canceller to diverge so that the energy of $S_{out}$ might become larger than that of $S_{in}$. In these situations, the ERLE estimates may decrease relatively significantly.

Referring back to FIG. 2, ERLE estimate comparer 214 detects relatively significant decreases from one ERLE estimate to the next by (i) dividing the previous ERLE estimate ERLE_est$_{i-1}$ by the current ERLE estimate ERLE_est$_i$ and (ii) comparing the resulting quotient (i.e., ERLE_est$_{i-1}$/ERLE_est$_i$) to a decrease threshold (decrease_thresh) as shown in Equation (6) below:

$$\text{decrease}_i = \begin{cases} 1(\text{significant decrease}), & \text{if } \frac{\text{ERLE\_est}_{i-1}}{\text{ERLE\_est}_i} > \text{decrease\_thresh} \\ 0(\text{insignificant decrease}), & \text{if } \frac{\text{ERLE\_est}_{i-1}}{\text{ERLE\_est}_i} \leq \text{decrease\_thresh} \end{cases} \quad (6)$$

Alternatively, relatively significant decreases may be detected by (i) determining the difference between the current ERLE estimate ERLE_est$_i$ and the previous ERLE estimate ERLE_est$_{i-1}$ in the logarithmic domain and (ii) comparing the difference to a decrease threshold.

As shown in Equation (6), if a resulting quotient is less than or equal to decrease_thresh, then decrease signal decrease$_i$ is deasserted (i.e., set equal to 0) indicating that a relatively significant decrease was not detected. In this case, ERLE estimate comparer 214 continues to generate comparisons until a relatively significant decrease is detected. If a resulting quotient is greater than decrease_thresh, then decrease signal decrease$_i$ is asserted (i.e., set equal to 1) indicating that a relatively significant ERLE decrease was detected (i.e., a possible EPC occurred). In this case, parameter initializer 216 (i) initializes EPC detection timer 236 to a specified hangover time (EPC_hang) and (ii) triggers EPC decision generator 204 to determine whether the ERLE estimation decrease (i.e., the possible EPC) was the result of an EPC or an occurrence of DT. Note that the use of a relatively small decrease threshold value may result in the detection of small changes in adaptation of the echo canceller that are not the result of EPCs, while the use of a relatively large decrease threshold value might result in some relatively small EPCs not being detected. Optimal decrease threshold values that balance these two considerations may be selected through experimentation.

When a relatively significant ERLE estimate decrease is detected, parameter initializer 216 also directs EPC decision generator 204 to assert adaptation control signal adapt_inhibit$_i$ to inhibit adaptation of the echo canceller. Inhibiting adaptation at this time may be beneficial because, if DT actually occurred, then divergence of the echo canceller will be prevented. Generally, DT occurs more frequently than EPCs, and thus, in most situations, divergence will be prevented. If, however, a relatively significant ERLE estimate decrease results from an EPC and not DT, then, within a relatively short period of time, EPC decision generator 204 may detect the EPC and restart adaptation for aggressive convergence on the new echo path.

EPC Decision Generator

Once triggered, EPC decision generator 204 generates a decision as to whether a relatively significant ERLE estimate decrease was the result of an EPC or DT based on two considerations. The first consideration is whether the echo canceller cancels echo relatively effectively during the hangover period EPC_hang with adaptation inhibited. The second consideration is whether a specified number of echo return loss (ERL) estimates are above or below a worst-case ERL for the network (e.g., 6 dB) during the hangover period EPC_hang. If EPC decision generator 204 determines that both (1) echo cancellation is relatively ineffective and (2) a sufficient number of ERL estimates are not below the worst-case ERL, then EPC decision generator 204 generates a decision that an EPC has occurred (i.e., an EPC decision). If generator 204 determines that either (1) echo cancellation is relatively effective or (2) a sufficient number of ERL estimates are below the worst-case ERL, then EPC decision generator 204 generates a decision that DT has occurred (i.e., a DT decision).

Echo cancellation effectiveness is considered via the upper path of EPC decision generator 204. In general, when an EPC occurs, a new echo path is introduced. Since adaptation is inhibited, the echo canceller will not be able to adapt to the new echo path. As a result, echo cancellation will typically be relatively ineffective because typically little if any echo will be cancelled (i.e., reduced). However, when DT occurs, the echo path remains unchanged. Since adaptation is inhibited, the echo canceller will continue to cancel echo using echo estimates generated before adaptation was inhibited. In this situation, echo cancellation will be relatively effective, assuming that cancellation was relatively effective before adaptation was inhibited.

EPC decision generator 204 determines whether echo cancellation is effective by comparing input signal $S_{in}$ to output signal $S_{out}$ over the hangover period EPC_hang. EPC decision generator 204 calculates (1) a magnitude $|S_{in,i}|$ for each sample of input signal $S_{in}$ using absolute value calculator 220 and (2) a magnitude $|S_{out,i}|$ for each sample of output signal $S_{out}$ using absolute value calculator 218. Each input sample magnitude $|S_{in,i}|$ is then compared to a corresponding output sample magnitude $|S_{out,i}|$ to determine whether echo might be cancelled for the sample. As described above, when adaptation of the echo canceller is inhibited and DT occurs, echo cancellation will typically be relatively effective (assuming echo cancellation was relatively effective prior to inhibition). In such a case, $S_{in,i}$ comprises both $S_{gen}$ and echo, while $S_{out,i}$ comprises $S_{gen}$ and a relatively small amount, if any, residual echo. Therefore, typically $|S_{out,i}|$ will be smaller than $|S_{in,i}|$ when adaptation of the echo canceller is inhibited and DT occurs. This is particularly true when the energy of $S_{gen}$ is (i) substantially equal to or (ii) less than the energy of the echo. However, as described below, in some instances, $|S_{out,i}|$ may be larger than $|S_{in,i}|$, even when echo cancellation is effective.

Reduction counter 222 counts the number of times that $|S_{out,i}|$ is smaller than $|S_{in,i}|$ during hangover period EPC_hang. When an output sample magnitude $|S_{out,i}|$ is less than a corresponding input sample magnitude $|S_{in,i}|$, reduction counter 222 (red_counter$_i$) is increased by one, and when an output sample magnitude $|S_{out,i}|$ is greater than or equal to a corresponding input sample magnitude $|S_{in,i}|$, reduction counter 222 red_counter$_i$ is not changed as shown in Equation (7) below:

$$\text{red\_counter}_i = \begin{cases} \text{red\_counter}_{i-1}, & \text{if } |S_{out,i}| \geq |S_{in,i}| \\ \text{red\_counter}_{i-1} + 1, & \text{if } |S_{out,i}| < |S_{in,i}| \end{cases} \quad (7)$$

After hangover period EPC_hang expires, reduction discriminator 224 then determines whether echo cancellation is relatively effective by comparing red_counter$_i$ to a reduction threshold red_thresh. As shown in Equation (8), cancellation signal eff_can$_i$ is asserted (i.e., set equal to 1) indicating that cancellation is relatively effective when red_counter$_i$ is greater than reduction threshold red_thresh. Further, cancellation signal eff_can$_i$ is deasserted (i.e., set equal to 0) indicating that cancellation is relatively ineffective when red_counter$_i$ is less than or equal to reduction threshold red_thresh.

$$\text{eff\_can}_i = \begin{cases} 1(\text{effective cancellation}), & \text{if } \text{red\_counter}_i > \text{red\_thresh} \\ 0(\text{ineffective cancellation}), & \text{if } \text{red\_counter}_i \leq \text{red\_thresh} \end{cases} \quad (8)$$

To determine whether cancellation is effective over the hangover period EPC_hang, it is important to select a suitable reduction threshold value. On one hand, the use of relatively small reduction threshold value may result in erroneous detections of effective cancellation when in fact cancellation was relatively ineffective. On the other hand, the use of a relatively large reduction threshold value may result in erroneous detections of ineffective cancellation when in fact cancellation was relatively effective over the hangover period EPC_hang. Optimal reduction threshold values that balance these two considerations may be selected through experimentation.

Note that an instantaneous sample of $S_{gen}$ may be out-of-phase with the echo, resulting in an $|S_{out,i}|$ value that is larger than the corresponding $|S_{in,i}|$ value, even though echo cancellation is relatively effective. For example, suppose that signal $S_{gen}$, generated at a communications device, such as communications device 102 of FIG. 1, is out-of-phase with the echo such that $S_{gen}$ and the echo destructively interfere with one another. In this case, an input sample magnitude $|S_{in,i}|$ (i.e., the magnitude of combined $S_{gen}$+echo) may be less than the magnitude $|S_{gen,i}|$ of the input sample attributable to signal $S_{gen}$. After the echo cancellation is performed, output signal $S_{out}$ mainly comprises signal $S_{gen}$, and thus, the input sample magnitude $|S_{in,i}|$ would be less than the output sample magnitude $|S_{out,i}|$ (i.e., $|S_{gen,i}|$). In this situation, even though echo cancellation is relatively effective, red_counter$_i$ is not increased. After the hangover time EPC_hang expires, reduction discriminator 224 may falsely determine that echo cancellation was ineffective indicating that an EPC occurred, when, in fact, DT occurred.

The probability of a false determination of ineffective cancellation is relatively low when the energy of $S_{gen}$ is comparable to, or smaller than, the energy of the echo. In this case, the input sample magnitude $|S_{in,i}|$ is largely determined by the echo. When echo is cancelled, the resulting output sample magnitude $|S_{out,i}|$ (i.e., $|S_{gen,i}|$) will typically be less than the input sample magnitude $|S_{in,i}|$. Therefore, decisions generated by reduction discriminator 224 are typically more accurate when the energy of $S_{gen}$ is comparable to, or smaller than the energy of the echo. To improve the accuracy of EPC decision generator 204 when the energy of $S_{gen}$ is larger than the energy of the echo, EPC decision generator 204 employs a second consideration (i.e., the lower path).

The lower path of EPC decision generator 204 generates ERL estimates over the hangover period EPC_hang and considers whether a specified number of the ERL estimates are above or below a lower boundary. The lower boundary, may be selected based on the lowest-possible ERL for the network, which is, for example, 6 dB for some telecommunications networks. In general, when DT is not present, the ERL estimates should not drop below the lowest-possible ERL, assuming that the ERL estimates are accurate. However, when DT is present, the ERL estimates might not be representative of the actual ERL, and consequently, the estimates could drop below the lowest-possible ERL, particularly when the energy of $S_{gen}$ is relatively large.

EPC decision generator 204 generates the ERL estimates by first calculating average energy values $E[|R_{in,i}|^2]$ for far-end signal $R_{in}$ received from a buffer (discussed below) using far-end energy calculator 226. Each new averaged far-end energy value $E[|R_{in,i}|^2]$ may be calculated using expected value (e.g., weighted moving average) methods as shown in Equation (9):

$$E[|R_{in,i}|^2] = \alpha E[|R_{in,i-1}|^2] + (1-\alpha)|R_{in,i}|^2 \qquad (9)$$

where $\alpha$ is a weighting constant between 0 and 1, $E[|R_{in,i-1}|^2]$ is the averaged far-end energy value for the previous iteration, and $|R_{in,i}|^2$ is the energy value for the current sample of far-end signal $R_{in}$.

The possibly delayed far-end energy values $E[|R_{in,i}|^2]$ received from far-end energy calculator 226 and the input signal energy values $E[|S_{in,i}|^2]$ received from input energy calculator 206 are used by echo ERL estimator 228 to generate estimates of the ERL. Since the actual echo is not known, ERL estimator 228 calculates each new ERL estimate (ERL_est$_i$) using input signal energy $E[|S_{in,i}|^2]$ in place of the echo energy as follows:

$$\text{ERL\_est}_i = \frac{E[|R_{in,i}|^2]}{E[|S_{in,i}|^2]} \qquad (10)$$

The accuracy of the ERL estimates may be degraded if the echo path delay between far-end signal $R_{in}$ and near-end signal $S_{in}$ is not compensated. Echo path delay is the delay between (1) a sample of near-end signal $S_{in}$ that contains echo and (2) a sample of far-end signal $R_{in}$ that corresponds to the echo in the sample of near-end signal $S_{in}$. Compensation for the echo path delay may be performed by retrieving samples of received signal $R_{in}$ from a buffer. In particular, when an estimate of the echo path delay from the echo canceller is available and stable, the delay estimate may be used to locate the sample of far-end signal $R_{in}$ contained in the history buffer that corresponds to the echo contained within the current sample of near-end signal $S_{in}$. Using corresponding samples of far-end signal $R_{in}$ and near-end signal $S_{in}$ may improve the accuracy of the ERL estimates.

As a result of using the input signal energy $E[|S_{in,i}|^2]$ in place of the energy of the actual echo, the ERL estimates might not be representative of the actual ERL when DT is present, and consequently, the ERL estimates might drop below the lowest-possible ERL for the network. For example, when DT occurs, generated signal $S_{gen}$ is added to input signal $S_{in}$, and, as a result, $S_{in}$ no longer represents just echo. As the proportion of far-end signal energy $E[|R_{in,i}|^2]$ to input signal energy $E[|S_{in,i}|^2]$ decreases due to the addition of generated signal $S_{gen}$, the ERL estimates typically become less representative of the actual echo. If generated signal $S_{gen}$ is relatively large in proportion to the echo, then the ERL estimates might decrease below the lowest-possible ERL for the network.

Even when DT is not present, some ERL estimates might drop below the lowest-possible ERL due to inaccuracies that may result from factors such as instability in the energy calculations, clipping of large signals, and inaccurate estimation of the echo path delay. To prevent false detections of DT that may arise from these factors, EPC decision generator 204 compares a number of ERL estimates to the lower boundary during the hangover period EPC_hang using ERL counter 230 (ERL_counter). When an ERL estimate is below the lower boundary, counter ERL_counter is increased by 1, and when an ERL estimate is greater than or equal to the lower boundary, counter ERL_counter is not changed as shown in Equation (11):

$$\text{ERL\_counter}_i = \begin{cases} \text{ERL\_counter}_{i-1}, & \text{if ERL\_est}_i \geq \text{lower boundary} \\ \text{ERL\_counter}_{i-1} + 1, & \text{if ERL\_est}_i < \text{lower boundary} \end{cases} \qquad (11)$$

After hangover period EPC_hang, ERL discriminator 232 makes a determination as to whether DT has occurred by comparing ERL_counter$_i$ to a threshold value (ERL_thresh). As shown in Equation (12), ERL comparison signal ERL_comp$_i$ is asserted (i.e., set equal to 1), when ERL_counter$_i$ is greater than threshold ERL_thresh. ERL comparison signal ERL_comp$_i$ is deasserted (i.e., set equal to 0), when ERL_counter$_i$ is less than or equal to threshold ERL_thresh.

$$\text{ERL\_comp}_i = \begin{cases} 1, & \text{if ERL\_counter}_i > \text{ERL\_thresh} \\ 0, & \text{if ERL\_counter}_i \leq \text{ERL\_thresh} \end{cases} \quad (12)$$

It is important to select a suitable ERL threshold value. On one hand, if a relatively small ERL threshold value is used, then ERL discriminator 232 may erroneously detect that DT is present. On the other hand, if a relatively large ERL threshold value is used, then ERL discriminator 232 may erroneously conclude that DT is not present. Optimal ERL threshold values that balance these two considerations may be selected through experimentation.

EPC discriminator 234 receives cancellation signal eff_can$_i$ and ERL comparison signal ERL_comp$_i$ and generates decisions as to whether an EPC or DT has occurred based on the values of these signals. In particular, as shown in Equation (13), if either eff_can$_i$ or ERL_comp$_i$ is asserted (i.e., set equal to 1), then EPC discriminator 234 generates a decision that DT has occurred. If both eff_can$_i$ and ERL_comp$_i$ are deasserted (i.e., set equal to 0), then EPC discriminator 234 generates a decision that an EPC has occurred.

$$\text{EPC\_decision}_i = \begin{cases} 1(DT), & \text{if eff\_can}_i = 1 \text{ or ERL\_comp}_i = 1 \\ 0(EPC), & \text{if eff\_can}_i = 0 \text{ and ERL\_comp}_i = 0 \end{cases} \quad (13)$$

When a decision that an EPC has occurred is generated, EPC discriminator 234 deasserts adaptation control signal adapt_inhibit$_i$ and asserts adaptation restart signal adapt_restart$_i$ to restart adaptation of the echo canceller from a more aggressive mode. When a decision that DT has occurred is generated, EPC discriminator 234 continues to assert adaptation control signal adapt_inhibit$_i$ to inhibit adaptation of the echo canceller. Adaptation control signal adapt_inhibit$_i$ may be deasserted and adaptation may be resumed when EPC detector 200 receives an indication 238 that DT is no longer present. Such an indication may be obtained from the echo canceller and may be generated by a DT algorithm such as that described in the background. Note that, while the present invention detects occurrences of DT, the present invention might not detect all occurrences of DT. Thus, a DT algorithm such as that described in the background may be used in conjunction with the present invention to detect further occurrences of DT.

Hangover period EPC_hang used by EPC decision generator 204 may be chosen based on experimentation. Shorter hangover periods generally result in quicker determinations of whether an EPC has occurred than longer hangover periods, while longer hangover periods generally result in more accurate decisions as to whether an EPC has occurred. Thus, experimentation may be used to determine the shortest hangover periods that may be used to generate sufficiently accurate decisions in worst-case scenarios (i.e., scenarios in which EPC detection is most susceptible to inaccurate calculations). Further, hangover periods EPC_hang may be chosen by considering the ITU G168 standard timing requirements for EPC detection and reconvergence.

According to various embodiments of the present invention, certain calculations discussed above may be performed at lower rates to reduce the computational load of EPC detector 200. For example, according to various embodiments, EPC detection initializer 202 and EPC discriminator 234, may be operated at a reduced rate of 1 KHz, while the other elements of EPC decision generator 204 operate at a full rate of 8 kHz. Simulations of EPC detector 200 have shown that various calculations operations may be performed at lower rates without sacrificing the ability of EPC detector 200 to accurately detect EPCs.

FIG. 3A-C graphically illustrate exemplary results of a simulation performed for an echo canceller that implements an EPC detector of the present invention. The simulation was performed over a 40-second time period using an EPC detector that was implemented using the parameters listed in TABLE I.

TABLE I

| SIMULATION PARAMETERS | |
| --- | --- |
| Parameter | Value |
| EPC detection initializer full rate frequency | 8 kHz |
| EPC detection initializer frequency | 1 kHz |
| EPC discriminator frequency | 1 kHz |
| Hangover EPC_hang | 2500 samples (312 ms with a sampling rate of 8 kHz) |
| Threshold decrease_thresh | 1.25 |
| Threshold can_thresh | 1500 |
| Threshold ERL_thresh | 1200 |

FIG. 3A shows a far-end signal R$_{in}$ that was introduced into the simulation. FIG. 3B shows the echo resulting from far-end signal R$_{in}$. EPCs were introduced every 10 seconds (i.e., at approximate times of 10 s, 20 s, and 30 s). As illustrated in FIG. 3C, the echo canceller, with the use of an EPC detector of the present invention, detected the EPCs relatively quickly and converged on the actual echo within a relatively short amount of time.

It will be further understood that various changes in the details, materials, and arrangements of the parts which have been described and illustrated in order to explain the nature of this invention may be made by those skilled in the art without departing from the scope of the invention as expressed in the following claims.

According to alternative embodiments of the present invention, the manner in which certain calculations, such as the ERLE estimates and ERL estimates, are performed may vary. For example, each ERLE estimate may be generated by taking the difference between an averaged input energy value $E[|S_{in,i}|^2]$ and an averaged output energy value $E[|S_{out,i}|^2]$ in the logarithmic domain as shown in Equation (14):

$$ERLE\_est_i = 10*\log_{10}(E[|S_{in,i}|^2]) - 10*\log_{10}(E[|S_{out,i}|^2]) \quad (14)$$

Each new ERLE estimate and prior ERLE estimate calculated using Equation (14) may then be compared by an estimate comparer (e.g., 214) to determine whether a relatively significant decrease in ERLE estimates has occurred. A relatively significant decrease may be determined by comparing either (i) the ratio of the new ERLE and prior ERLE estimate or (ii) the difference between the new ERLE and prior ERLE estimate in the logarithmic domain to a threshold value in a manner similar to that described above in relation to Equation (6). Similarly, ERL estimates may be generated by taking the difference between the possibly delayed far-end averaged energy values $E[|R_{in,i}|^2]$ and the input signal energy values $E[|S_{in,i}|^2]$ in the logarithmic domain.

In addition, alternative embodiments of the present invention may employ counting methods other than those described in relation to the embodiment of FIG. 2. For example, a reduction counter (e.g., 222) may count ineffective cancellations rather than effective cancellations. The number of ineffective cancellations (i.e., the number of times $|S_{out,i}| \geq |S_{in,i}|$) may then be compared to a reduction threshold. If the number of ineffective cancellations is less than the reduction threshold, then the reduction discriminator (e.g., 224) may determine that cancellation was effective. Similarly, counting methods other than that described in relation to ERL counter 230 may be used according to alternative embodiments of the present invention.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

I claim:

1. A method for detecting a possible occurrence of an echo path change in a telecommunications network, the method comprising:
   (a) generating a pre-cancellation measure of average energy of a near-end signal in the telecommunications network prior to echo cancellation;
   (b) generating a post-cancellation measure of average energy of the near-end signal after the echo cancellation;
   (c) generating a current echo return loss enhancement (ERLE) estimate based on the pre-cancellation near-end average energy measure and the post-cancellation near-end average energy measure;
   (d) repeating steps (a)-(c) to generate a subsequent ERLE estimate; and
   (e) comparing the current ERLE estimate to the subsequent ERLE estimate to detect the possible occurrence of the echo path change.

2. The invention of claim 1, wherein step (c) comprises generating the ERLE estimate based on a ratio of the pre-cancellation near-end average energy measure and the post-cancellation near-end average energy measure.

3. The invention of claim 1, wherein step (e) comprises comparing (i) a ratio of the current ERLE estimate and the subsequent ERLE estimate to (ii) a specified threshold level to detect the possible occurrence of the echo path change.

4. The invention of claim 1, further comprising the step of:
   (f) determining whether the possible occurrence of the echo path change is an actual occurrence of the echo path change or an occurrence of double talk in the telecommunication network.

5. The invention of claim 4, further comprising the steps of:
   (g) restarting adaptation of an echo canceller if the possible occurrence is determined to be the actual occurrence of the echo path change; and
   (h) inhibiting the adaptation of the echo canceller if the possible occurrence is determined to be the occurrence of the double talk.

6. The invention of claim 4, wherein step (f) comprises:
   (f1) inhibiting coefficient updating for an echo canceller;
   (f2) comparing magnitudes of the post-cancellation near-end signal to magnitudes of the pre-cancellation near-end signal;
   (f3) generating a counter value based on the comparisons of step (f2);
   (f4) comparing the counter value to a specified threshold level; and
   (f5) determining whether the possible occurrence of the echo path change is the occurrence of the double talk based on the comparison of step (f4).

7. The invention of claim 6, wherein:
   the counter value is generated in step (f3) by counting instances in which the magnitude of the post-cancellation near-end signal is smaller than the magnitude of the pre-cancellation near-end signal; and
   step (f5) comprises determining that the possible occurrence of the echo path change is the occurrence of the double talk if step (4) determines that the counter value is greater than the specified threshold level.

8. The invention of claim 6, wherein step (f) further comprises:
   (f6) generating far-end average energy measures of a far-end signal in the telecommunications network;
   (f7) generating echo return loss (ERL) estimates based on the far-end average energy measures and the pre-cancellation near-end average energy measures;
   (f8) comparing the ERL estimates to a boundary value;

(f9) generating a second counter value based on the comparisons of step (f8);
(f10) comparing the second counter value to a second specified threshold level; and
(f11) determining whether the possible occurrence of the echo path change is the occurrence of the double talk based on the comparison of step (f10).

9. The invention of claim 8, further comprising the step of:
(f12) determining that the possible occurrence of the echo path change is the actual occurrence of the echo path change if the occurrence of the double talk is not determined in both steps (f5) and (f11).

10. The invention of claim 4, wherein step (f) comprises:
(f1) generating far-end average energy measures of a far-end signal in the telecommunications network;
(f2) generating ERL estimates based on the far-end average energy measures and the pre-cancellation near-end average energy measures;
(f3) comparing the ERL estimates to a boundary value;
(f4) generating a counter value based on the comparisons of step (f3);
(f5) comparing the counter value to a specified threshold level; and
(f6) determining whether the possible occurrence of the echo path change is the occurrence of the double talk based on the comparison of step (f5).

11. The invention of claim 10, wherein the boundary value is a lowest-possible ERL value for the telecommunications network.

12. The invention of claim 10, wherein step (f2) comprises generating each ERL estimate based on a ratio of one of the far-end average energy measures to one of the pre-cancellation near-end average energy measures.

13. The invention of claim 12, wherein:
an echo path delay exists between receipt of the far-end signal and occurrence of corresponding echo in the near-end signal; and
at least one of the pre-cancellation near-end average energy measure and the far-end average energy measure used to generate each ERL estimate in step (f2) is generated by taking into account the echo path delay.

14. The invention of claim 10, wherein:
the counter value is generated in step (f4) by counting instances in which the ERL estimates are smaller than the boundary value; and
step (f6) comprises determining that the possible occurrence of the echo path change is the occurrence of the double talk if step (f5) determines that the counter value is greater than the specified threshold level.

15. An apparatus for detecting a possible occurrence of an echo path change in a telecommunications network, the apparatus comprising:
means for generating pre-cancellation measures of average energy of a near-end signal in the telecommunications network prior to echo cancellation;
means for generating post-cancellation measures of average energy of the near-end signal after the echo cancellation;
means for generating echo return loss enhancement (ERLE) estimates based on the pre-cancellation near-end average energy measures and the post-cancellation near-end average energy measures; and
means for comparing a current ERLE estimate to a subsequent ERLE estimate to detect the possible occurrence of the echo path change.

16. A method for determining whether a possible occurrence of an echo path change is an actual occurrence of the echo path change or an occurrence of double talk in a telecommunications network, the method comprising:
(a) detecting the possible occurrence of the echo path change;
(b) comparing magnitudes of a post-cancellation near-end signal in the telecommunications network to magnitudes of a pre-cancellation near-end signal in the telecommunications network;
(c) generating a counter value based on the comparisons of step (b);
(d) comparing the counter value to a specified threshold level; and
(e) determining whether the possible occurrence of the echo path change is the occurrence of the double talk based on the comparison of step (d).

17. The invention of claim 16, wherein:
the counter value is generated in step (c) by counting instances in which the magnitude of the post-cancellation near-end signal is smaller than the magnitude of the pre-cancellation near-end signal; and
step (e) comprises determining that the possible occurrence of the echo path change is the occurrence of the double talk if step (d) determines that the counter value is greater than the specified threshold level.

18. The invention of claim 17, further comprising:
(f) generating far-end average energy measures of a far-end signal in the telecommunications network;
(g) generating ERL estimates based on the far-end average energy measures and the pre-cancellation near-end average energy measures;
(h) comparing the ERL estimates to a boundary value;
(i) generating a counter value based on the comparisons of step (h);
(j) comparing the counter value to a second specified threshold level; and
(k) determining whether the possible occurrence of the echo path change is the occurrence of double talk based on the comparison of step (j).

19. The invention of claim 18, further comprising the step of:
(l) determining that the possible occurrence of the echo path change is the actual occurrence of the echo path change if the occurrence of the double talk is not determined in both steps (e) and (k).

20. The invention of claim 19, wherein:
step (a) further comprises inhibiting coefficient updating for an echo canceller; and
the method further comprises restarting adaptation of an echo canceller if the possible occurrence is determined to be the actual occurrence of the echo path change.

21. An apparatus for determining whether a possible occurrence of an echo path change is an actual occurrence of the echo path change or an occurrence of double talk in a telecommunications network, the apparatus comprising:
means for detecting the possible occurrence of the echo path change;
means for comparing magnitudes of a post-cancellation near-end signal in the telecommunications network to magnitudes of a pre-cancellation near-end signal in the telecommunications network;
means for generating a counter value based on the comparisons of the post-cancellation near-end signal magnitudes and the pre-cancellation near-end signal magnitudes;
means for comparing the counter value to a specified threshold level; and means for determining whether the possible occurrence of the echo path change is the occurrence of the double talk based on the comparison of the counter value to the specified threshold level.

22. A method for determining whether a possible occurrence of an echo path change is an actual occurrence of the echo path change or an occurrence of double talk in a telecommunications network, the method comprising:
(a) detecting the possible occurrence of the echo path change;
(b) generating pre-cancellation measures of average energy of a near-end signal in the telecommunications network;
(c) generating far-end average energy measures of a far-end signal in the telecommunications network;
(d) generating ERL estimates based on the far-end average energy measures and the pre-cancellation near-end average energy measures;
(e) comparing the ERL estimates to a boundary value;
(f) generating a counter value based on the comparisons of step (e);
(g) comparing the counter value to a specified threshold level; and
(h) determining whether the possible occurrence of the echo path change is the occurrence of the double talk based on the comparison of step (g).

23. The invention of claim 22, wherein the boundary value is a lowest-possible ERL value for the telecommunications network.

24. The invention of claim 23, wherein step (d) comprises generating each ERL estimate based on a ratio of one of the far-end average energy measures to one of the pre-cancellation near-end average energy measures.

25. The invention of claim 24, wherein:
an echo path delay exists between receipt of the far-end signal and occurrence of corresponding echo in the near-end signal; and
at least one of the pre-cancellation near-end average energy measure and the far-end average energy measure used to generate each ERL estimate in step (d) is generated by taking into account the echo path delay.

26. The invention of claim 22, wherein:
the counter value is generated in step (f) by counting instances in which the ERL estimates are smaller than the boundary value; and
step (h) comprises determining that the possible occurrence of the echo path change is the occurrence of the double talk if step (g) determines that the counter value is greater than the specified threshold level.

27. An apparatus for determining whether a possible occurrence of an echo path change is an actual occurrence of the echo path change or an occurrence of double talk in a telecommunications network, the apparatus comprising:
an EPC detection initializer adapted to detect the possible occurrence of the echo path change;
an input energy calculator adapted to generate pre-cancellation measures of average energy of a near-end signal in the telecommunications network;
a far-end energy calculator adapted to generate measures of average energy of a far-end signal in the telecommunications network;
an ERL estimator adapted to generate ERL estimates based on the far-end average energy measures and the pre-cancellation near-end average energy measures;
an ERL counter adapted to (1) compare the ERL estimates to a boundary value and (2) generate a counter value based on the comparisons of the ERL estimates to the boundary value;
an ERL discriminator adapted to compare the counter value to a specified threshold level; and
an EPC discriminator adapted to determine whether the possible occurrence of the echo path change is the occurrence of the double talk based on the comparison of the counter value to the specified threshold level.

* * * * *